United States Patent [19]
Suni

[11] Patent Number: 5,572,541
[45] Date of Patent: Nov. 5, 1996

[54] LASER ROD ASSEMBLY FOR SIDE PUMPED LASERS

[75] Inventor: Paul J. M. Suni, Longmont, Colo.

[73] Assignee: Coherent Technologies, Inc., Lafayette, Colo.

[21] Appl. No.: 322,271

[22] Filed: Oct. 13, 1994

[51] Int. Cl.⁶ .................................................. H01S 3/091
[52] U.S. Cl. .............................. 372/70; 372/34; 372/39; 372/69; 372/103; 372/23; 372/64; 372/9
[58] Field of Search ................................. 372/72, 75, 76, 372/923, 107, 34, 39, 103, 69, 64

[56] References Cited

U.S. PATENT DOCUMENTS

| | | | |
|---|---|---|---|
| 4,860,295 | 2/1989 | Byer et al. | 372/19 |
| 4,902,127 | 2/1990 | Byer et al. | 356/5 |
| 4,969,155 | 11/1990 | Kahan | 372/70 |
| 5,005,175 | 4/1991 | Desurvire et al. | 372/6 |
| 5,040,187 | 8/1991 | Karpinski | 372/50 |
| 5,140,607 | 8/1992 | Paiva | 372/70 |

OTHER PUBLICATIONS

"Composite Rod Optical Masers," Applied Optics vol. 1, No.1, Jan. 1962, G. E. Devlin, J. McKenna, A. D. May, and A. L. Schawlow.

Primary Examiner—Leon Scott, Jr.
Attorney, Agent, or Firm—James R. Young; Chrisman, Bynum & Johnson

[57] ABSTRACT

A composite, glass or crystalline laser rod having a doped, light-absorbing core portion surrounded by a transparent cladding portion that is either undoped or doped with a nonabsorbing material is side-pumped with a plurality of laser diodes dispersed angularly around the laser rod. A reflective coating or sleeve substantially surrounds the laser rod, except for entrance slits for the pump light, to confine unabsorbed pump light in the crystalline laser rod by reflecting and re-reflecting the pump light in the rod to increase the likelihood of absorption by the core portion. The reflective coating is substantially reflective of all the pump light, but it can be transparent to laser radiation emission by the rod. An absorptive coating that absorbs radiation of the wavelength of the laser radiation emission of the rod can be positioned around the outside of the reflective coating to absorb lateral laser emission of the rod. A clamp assembly with a rod holding axial bore and radially extending slots t,hat provide clamping flexibility and channel pump light transversely into the laser rod.

54 Claims, 11 Drawing Sheets

LASER ROD ASSEMBLY FOR SIDE PUMPED LASERS

BACKGROUND OF THE INVENTION

1. Field of the Invention

The present invention is related generally to lasers and more specifically to side-pumped composite laser rods and a mounting structure for increased efficiency of such lasers.

2. State of the Prior Art

Side-pumped solid-state laser rods have an advantage over longitudinal pumped rods in that they are more readily scaled to higher output powers, because they are more conducive to pumping with a plurality of light sources. However, conventional side-pumped rods are often not very efficient absorbers of the pumping radiation, primarily because the rods are fairly transparent and not very thick, so a substantial portion of the radiation from the pump source can pass all the way through the rod without being absorbed. Some pump source radiation can also be lost by reflection from curved lateral surfaces of cylindrical-shaped laser rods, and there can be problems in maintaining $TEM_{00}$ mode operation when too much of the pump light that is absorbed by the rods gets absorbed close to the incident surface of the rod. Limited heat dissipation at higher average power operation can also result in serious thermo-optic distortions in the rod due to excessive heat build-up. Physical damage due to stress-fracture may also occur with high heat loads.

There have been several developments to alleviate the problems with side-pumped lasers. For example, G. E. Devlin et al., "Composite Rod Optical Masers," *Applied Optics*, Vol. 1, No. 1, Jan. 1962, reported the development and testing of a composite rod in which a core of doped, light absorbant gain medium is surrounded by a transparent cladding. This composite structure enhanced radiation absorption in the doped core, and the larger diameter cladding provided increased heat exchange surface area for more efficient heat dissipation to the surrounding environment. R. Byer et al., in their U.S. Pat. No. 4,860,295, issued on Aug. 22, 1989, disclosed improvements in such composite rods, comprising a neodymium doped yttrium aluminum garnet (Nd: YAG) core surrounded by a cladding made of the undoped base material. The undoped base material of the cladding is not absorptive, while the doped core does absorb some of the transversely directed side-pump light and functions as the gain medium. However, the Byer et al. core and cladding materials have the same atomic structure, except for the doping ions in the core, to minimize index of refraction differences between the core and the cladding so that the $TEM_{00}$ mode diameter can be greater than the core portion diameter without extensive index of refraction discontinuity, which enhances utilization of absorbed energy. The Byer et al. patent also discloses a reflecting element positioned diametrically opposite the pump light source to reflect the pump light that passes unabsorbed through the rod back into the rod for another opportunity to be absorbed, thereby effectively lowering the threshold energy necessary for laser action.

However, further improvements in pumping efficiency, heat dissipation, and mounting structures are still needed to improve the performance of side-pumped lasers for a multitude of potential commercial applications, such as medical and industrial lasers and transmitter sources for remote sensing.

SUMMARY OF THE INVENTION

Accordingly, it is a general object of the present invention to improve the efficiency and gain as well as to lower the energy threshold necessary for amplification of transverse, or sidepumped, solid-state laser rods.

A more specific object of the present invention is to increase absorption of transversely directed pump light in composite laser rods.

A mother specific object of the present invention is to enhance heat dissipation efficiency in side-pumped laser rod crystals.

A still further specific object of the present invention is to provide a convenient and efficient mounting for elongated cylindrical laser rods that accommodates multiple side-pump light sources and effective heat transfer from the laser rod.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the laser red assembly according to this invention comprises an elongated, crystalline or glass rod, preferably having a doped, pump light-absorbing core portion surrounded by a non-doped, transparent cladding portion, with a reflective surface that substantially surrounds the peripheral surface of the cladding portion to confine unabsorbed pump light within the crystalline rod and to reflect and re-reflect the unabsorbed pump light through the core portion. One or more entrance slits or apertures is provided in the reflective surface to admit pump light projected from the side transversely into the crystalline rod. A clamp assembly comprising a massive, heat conducting body has an axial bore for receiving and holding the crystalline rod, and the massive, heat conducting material is for conducting heat away from the crystalline rod. Compression slots in the clamp body extending radially outward from the bore serve the dual functions of providing sufficient flexibility in the clamp body to allow the clamp body to be drawn snugly around the crystalline rod and to admit pump light into the lateral or peripheral side of the crystalline rod. The slot can be wide enough to not affect the pump light, or it can be narrower with either parallel, converging, or diverging sides to channel the pump light and direct it in a desired manner through the core portion. The reflective surface can be smooth for spectral reflection, textured for diffuse reflection, or grooved for dispersed reflection in substantially one plane. The cladding, or the interface between the cladding and the clamp body, may also incorporate materials absorptive at the laser wavelength in order to prevent parasitic laser oscillation in the plane transverse to the laser rod axis.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In The Drawing

DETAILED DESCRIPTION OF THE PREFERRED EMBODIMENTS

Figure 1:
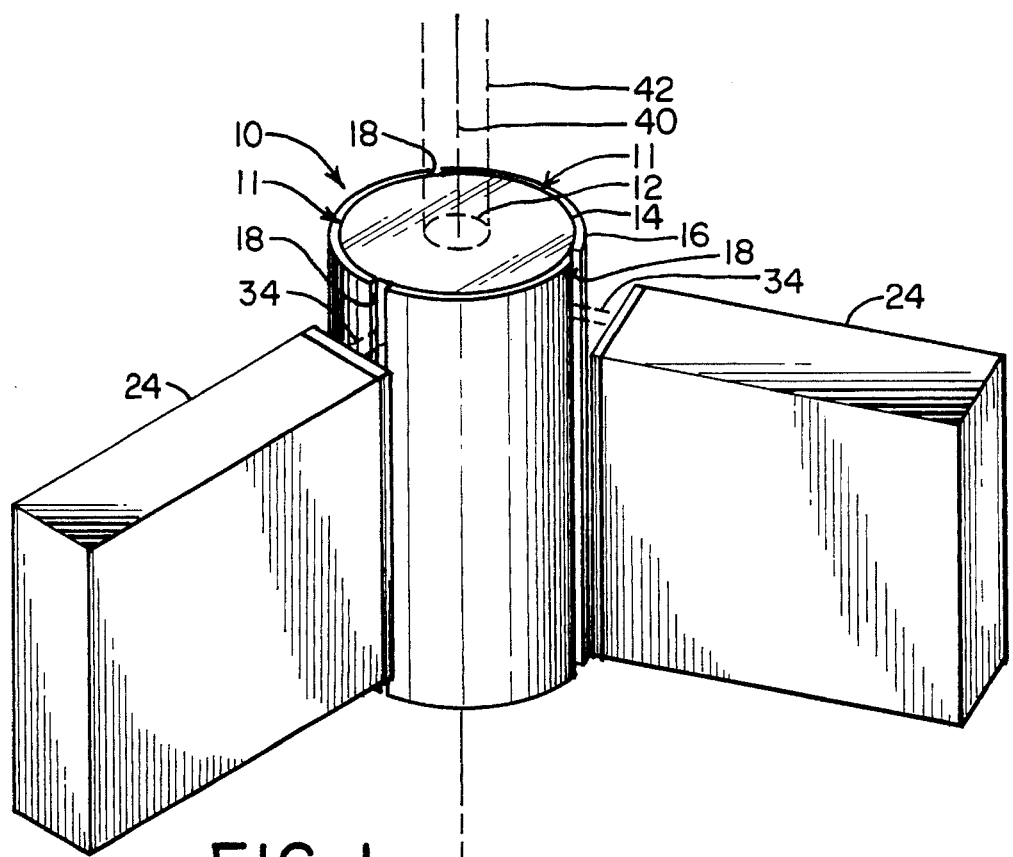
FIG. 1 is a perspective conceptual view of a composite, solid-state laser rod with a reflective peripheral coating according to this invention.
Figure 2:
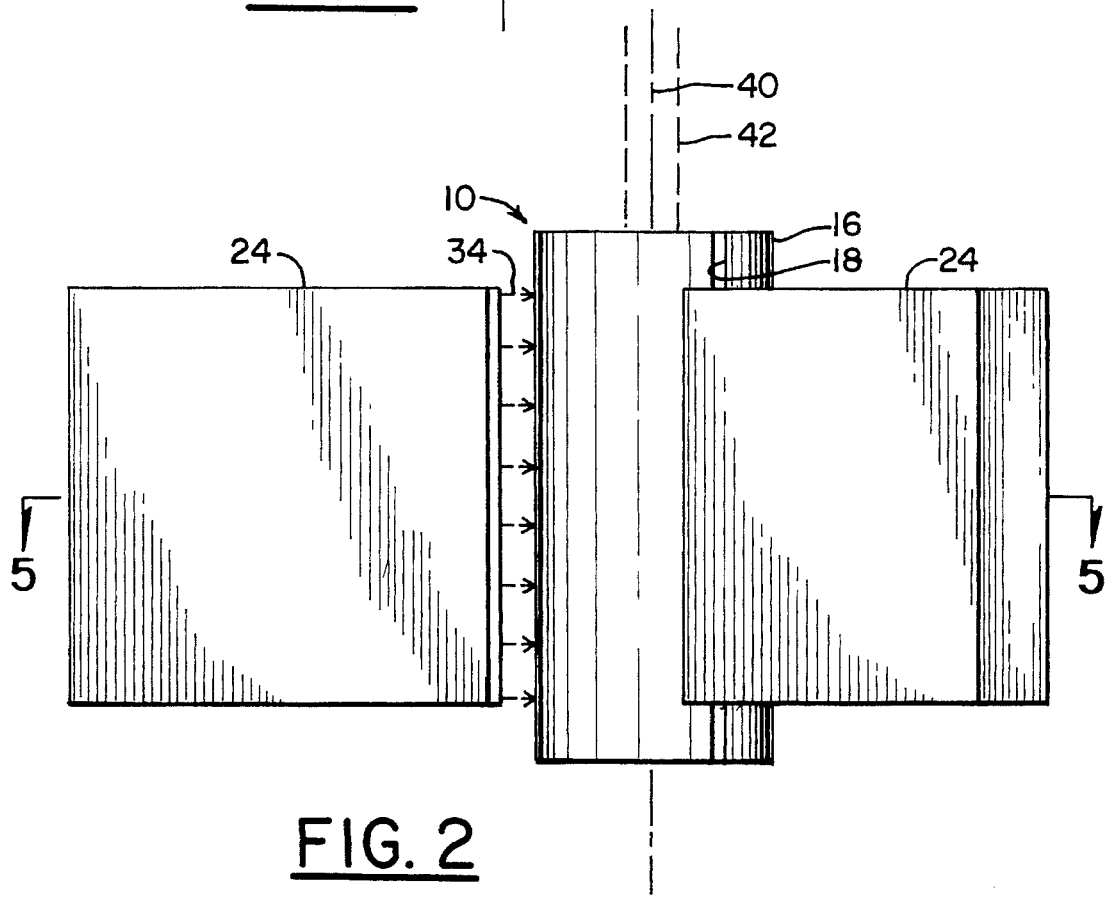
FIG. 2 is an elevation view of the composite, solid-state laser rod of this invention.
Figure 3:
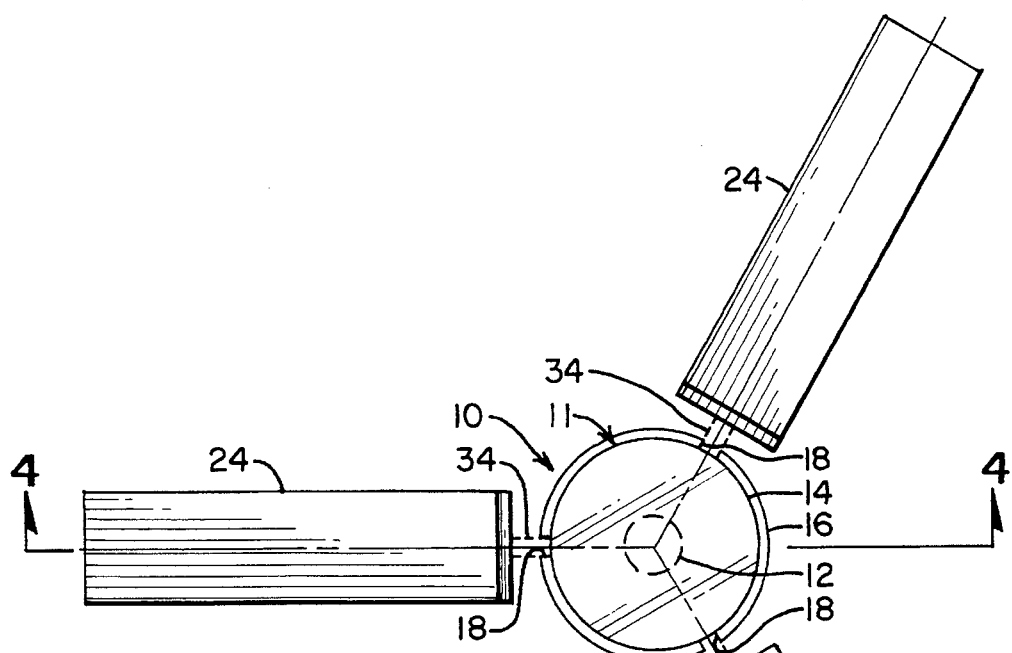
FIG. 3 is a top plan view of the composite, solid-state laser rod of this invention.
Figure 4:
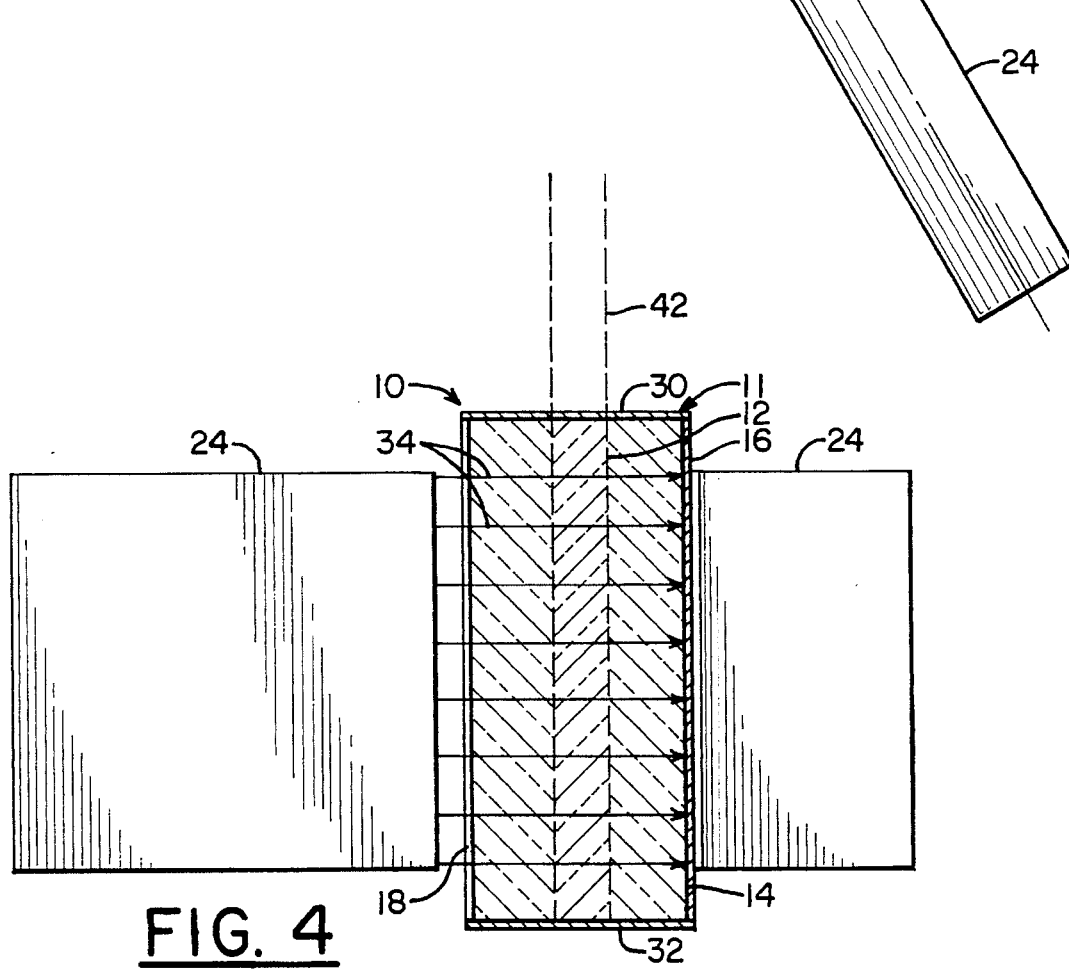
FIG. 4 is a cross-sectional view of the composite, solid-state laser rod of this invention taken along lines 4—4 of FIG. 3.

The laser rod assembly 10 according to the present invention is shown conceptually in FIGS. 1–5, including an elongated composite crystalline light amplifying composite laser rod 11, preferably, but not necessarily, in the shape of a cylinder, with a doped, light-absorbing core portion 12 surrounded by a non-doped, non-absorbing cladding portion 14. Except for the doping, the absorbing core portion 12 is preferably the same base crystalline material as the cladding portion 14, so they have substantially the same thermal and mechanical properties. Such crystalline material can be, for example yttrium aluminum garnet (YAG), and the core portion 12 can be doped with thulium (Tm: YAG), although this invention is applicable to any laser material, regardless of whether the core and cladding portions are comprised of the same base crystalline materials and regardless of whether all or part of the composite laser rod 11 is doped. While the doped core 12 is illustrated as a substantially circular cylinder, it does not have to be confined to that shape. In fact, with current technology, it might be easier to make a core 12 that does not have a circular cross-section, such as by slicing or otherwise producing and assembling multiple pieces of core material in other shapes that have planar surfaces, such as triangular or hexagonal prisms, and then assembling the pieces together in a composite "nearly" cylindrical core configuration. A reflective coating 16 is provided around substantially the entire peripheral surface of the cladding portion 14 of the composite laser rod 11, except for one or more narrow, side light entrance slits 18. As best seen in FIG. 4, the ends of the laser rod assembly 10 may have anti-reflection (AR) coatings 30, 32 at the laser wavelength so that laser emission can be transmitted clear through the entire laser rod. Although not shown in these drawings, it is well-known that most lasers, including the laser rod assembly 10 of this invention, have reflectors positioned in axial relation to the composite laser rod 11 to reflect laser emission and pump radiation back into the composite laser rod 11 to complete the laser resonator. One of such axially positioned reflectors is not totally reflective so that it emits the amplified laser beam 42 produced by the laser rod assembly 10 while the other reflector is totally reflective of the laser emission, as is also well-known to persons skilled in this art and which is not part of this invention. However, as is also well known in this art, laser rods can be used simply to amplify, rather than oscillate, laser light. In such amplifier configurations, the external reflectors described above may not be used. Instead, a light beam may be passed one or more times axially through the rod to amplify its power. The peripheral reflector and other features of this invention can be used to enhance either the oscillation or the amplifier configurations.

In this embodiment of this invention, as illustrated in FIGS. 1–5, side-pump light beams 34 are directed transversely through the entrance slits 18 into the composite laser rod 11. Such side-pump light can be provided by one or more laser diodes 24, for example an infrared (IR) laser diode, which are also well-known in the art and readily available from a number of manufacturers. For example, but not for the purposes of limitation, the laser diode can be a Model 3245-C1 manufactured by SDL, Inc. of San Jose, Calif., which emits an elongated, narrow beam 34 of laser radiation from a semiconductor junction. The length of the composite laser rod 11 is preferably similar in length to the elongated pump light beam 34 to avoid long, unpumped regions in the composite laser rod 11 and the potentially high losses and lower performance that would result from such long, unpumped regions.

Figure 5:
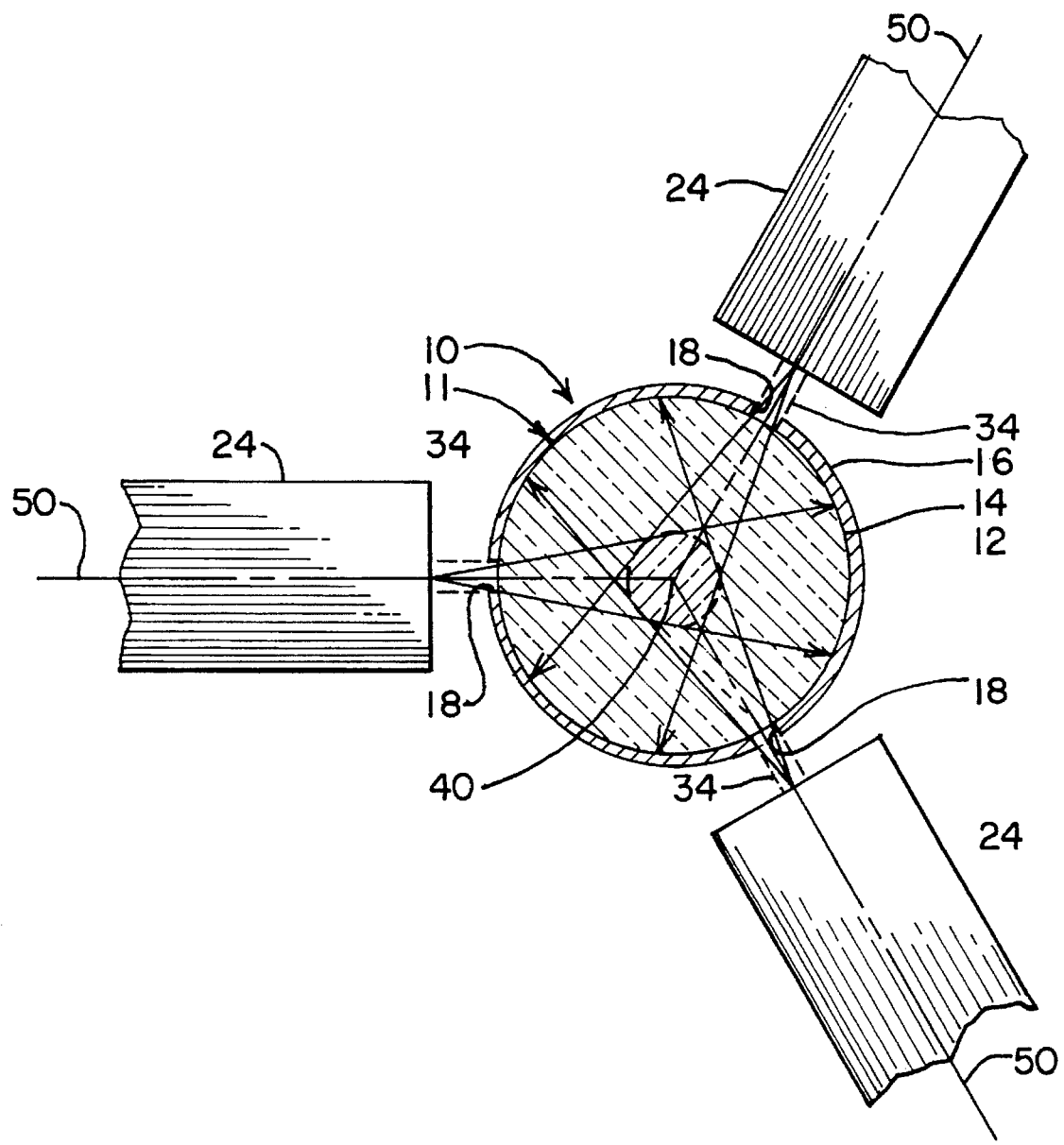
FIG. 5 is a cross-sectional view of the composite, solid-state laser rod of this invention taken along lines 5—5 of FIG. 2.
Figure 6:
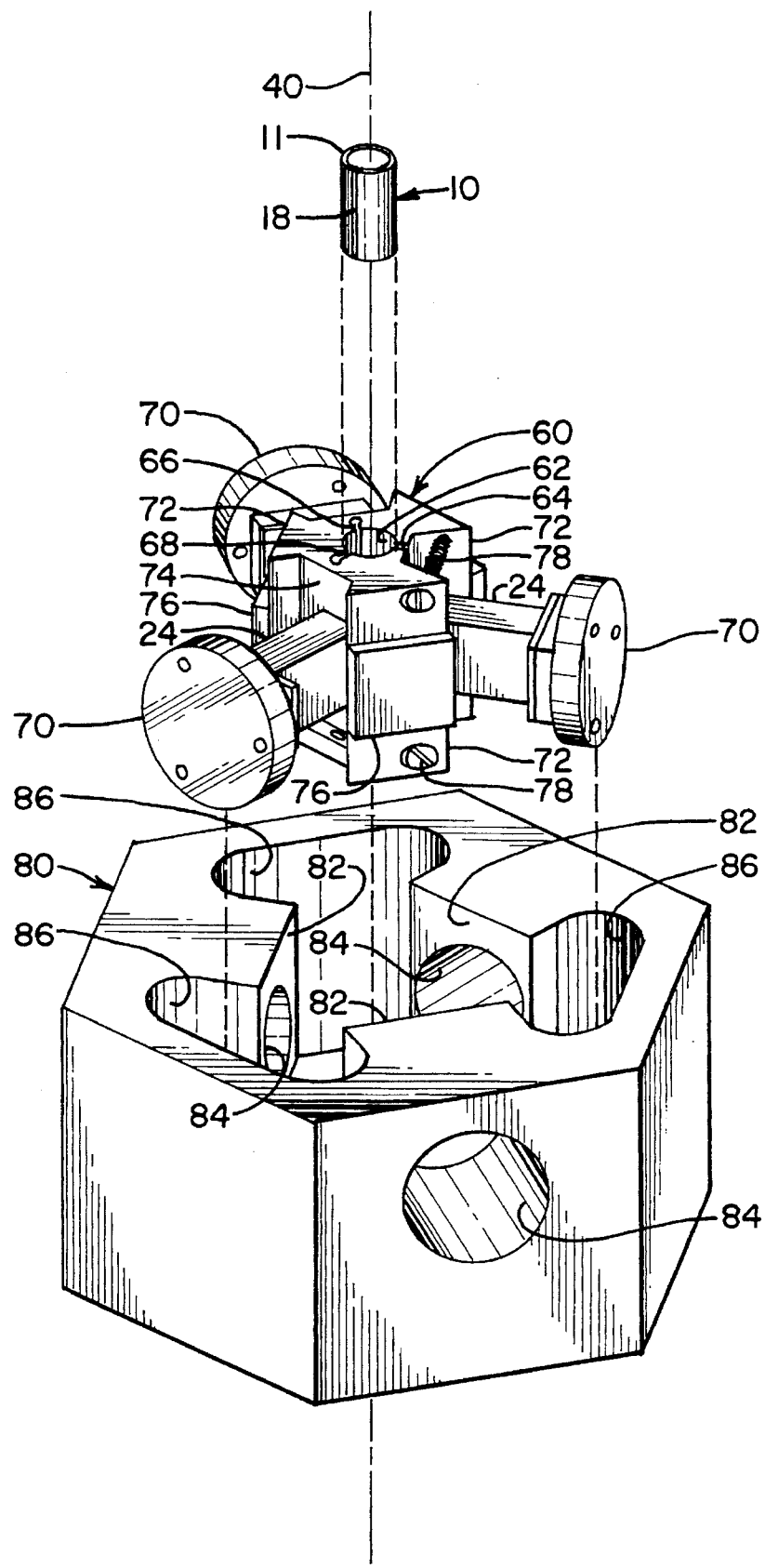
FIG. 6 is a perspective view of a mounting structure for the laser rod according to this invention.
Figure 7:
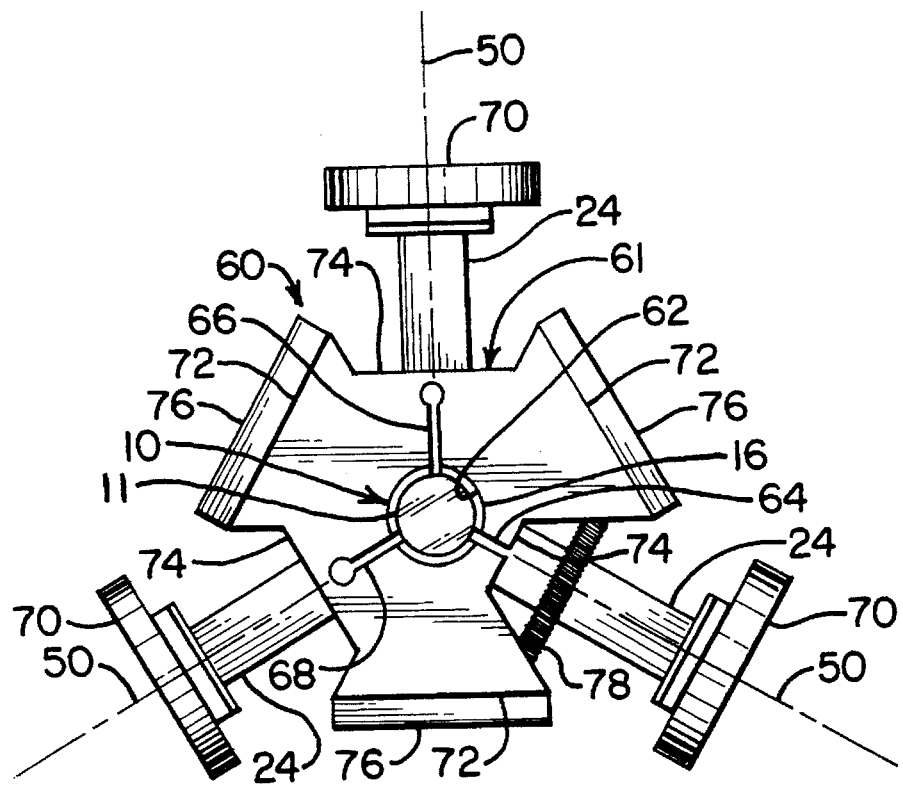
FIG. 7 is a plan view of the clamp assembly for mounting the laser rod according to this invention.
Figure 8:
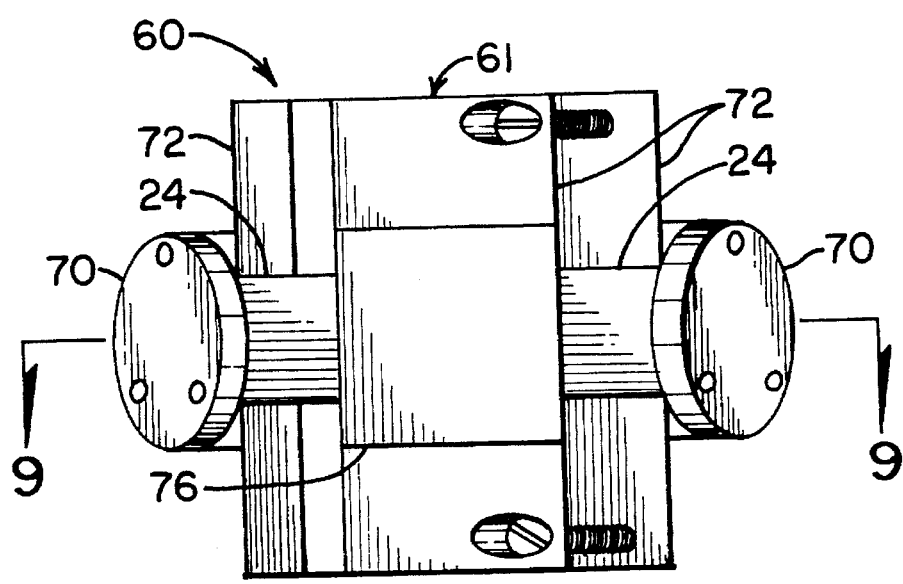
FIG. 8 is an elevation view of the clamp assembly.

As best seen in FIG. 5, the side-pump light beams 34 are preferably directed into the composite laser rod 11 with the axis 50 substantially perpendicular to the longitudinal axis 40 of the composite laser rod 11 and in a pattern that is substantially confined to passing into the doped, light-absorbing core portion 12, where at least some of the pump light beam 34 is absorbed by the core 12 to excite ions in the crystal lattice therein to higher energy states and to produce laser light. The undoped cladding portion 14 is substantially transparent to the pump light beam 34, but light in beam 34 that is not absorbed initially in the doped core portion 12 gets reflected and re-reflected by the reflective coating 16, which substantially surrounds the composite laser rod 11, back and forth through the composite laser rod 11 many times, thereby increasing significantly the chances that a much larger proportion of the photons in pump light beam 34 will be absorbed in the core 12. Consequently, the pump light absorption efficiency is improved substantially, and the power input necessary for threshold laser oscillation is reduced. The entrance slits 18 should be as small as possible, essentially just large enough to admit the pump light beam 34, to avoid loss of power by loss of reflected radiation through them. Also, if more than one entrance slit 18 and pump light source 24 are used, it is preferred, but not essential, to not locate them diametrically opposite each other in relation to the composite laser rod 11 to ensure that substantially all of the pump light beam 34 that is not absorbed by the core 12 on the first pass therethrough gets reflected by coating 16 at least once and preferably many more times. For example, the three entrance slits 18 shown in FIGS. 1–5 are disposed radially at about 120 degree angles in relation to each other with respect to the longitudinal axis 40 of the composite laser rod 11.

Figure 15:
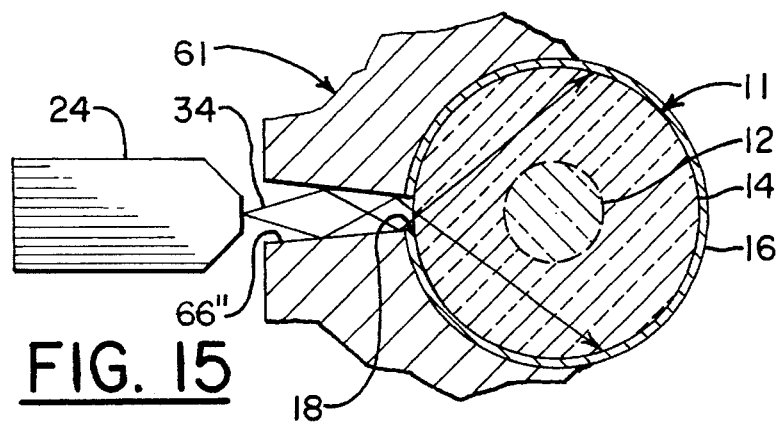
FIG. 15 is a diagrammatic view similar to FIG. 11, but illustrating a tapered, converging light guide coupling of the laser rod to the laser diode pump.
Figure 16:
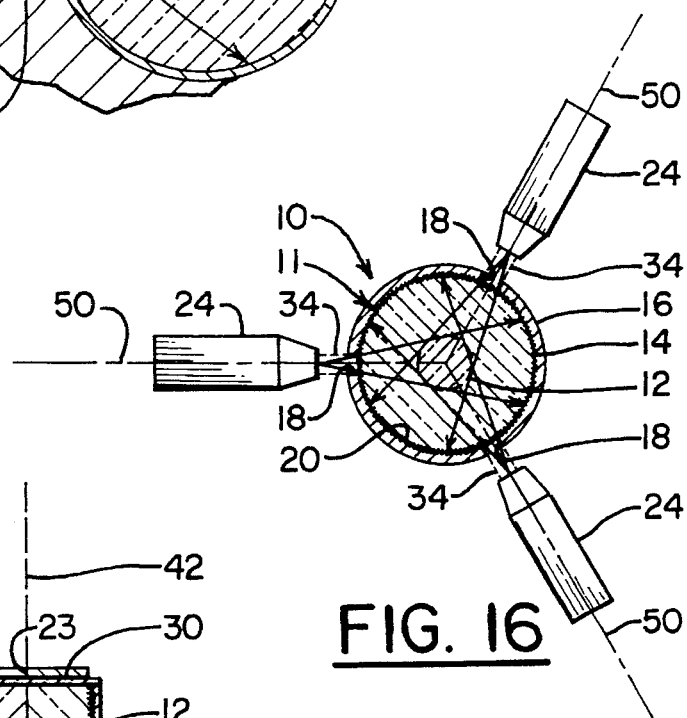
FIG. 16 is a diagrammatic cross-sectional view similar to FIG. 5 of the laser rod assembly of this invention, but illustrating a grooved or textured reflective surface for dispensing or diffusing pump light in the laser rod.

It is also preferred that the reflective surface of the coating 16 be smooth to provide specular reflectance to avoid loss of pump light energy through the end 30. However, a textured reflective surface, as illustrated in FIGS. 15 and 16, could be used to increase chances of reflections or re-reflections of the pump light beam 34 being propagated into the core 12 at some point. Such a textured reflective surface would be particularly advantageous where the angular divergence of the pump light beam 34 in the plane transverse to laser rod axis 40 is high enough that a substantial portion of the pump light beam 34 does not pass through the doped core 12.

The pump light, as is well-known in the art, excites atoms or ions in the crystal lattice of the core 12, where it is absorbed, causing electrons to move to higher energy levels. When they relax to lower energy levels, the atoms produce light or other radiation at a characteristic wavelength for that atomic species, which is confined in the composite laser rod 11 by the axially positioned reflectors (not shown), as is also well-known in the art as explained above. When a sufficient number of ions in the doped core 12 are promoted to the higher energy state, the radiation confined by the axially positioned reflectors experiences gain. It also experiences loss due to scattering, transmission through the axially positioned partial reflector (not shown), and other effects. When the gain is high enough to offset the losses, the laser oscillation threshold is reached. Further increases in the radiation of pump beam 34 increases the mount of radiation in the amplified laser beam 42 extracted through the partial reflector. The confinement and re-reflection of the pump light beam 34 by the surrounding reflective coating 16 facilitates reaching the laser threshold with less pump light input, which increases the efficiency of the laser rod assembly 10.

Because of the effective confinement of the pump light in the composite laser rod 11 and consequent increased absorption of the light by the core 12, the power production and heat dissipation in the composite laser rod 11 is very high.

The crystalline structure of the cladding portion 14 is an effective heat transfer medium to conduct heat and transmit infrared radiation away from the core 12, where most of the heat is produced. The peripheral surface of the cladding portion 14, from where heat is dissipated to the surrounding environment, is substantially larger than the core portion 12, so this structure does accommodate greater heat transfer than non-composite laser rods. Also, the reflective coating 16 which preferably comprises a metal, such as indium, gold, aluminum, silver, or another highly reflective material, including dielectrics, also enhances heat transfer away from the composite laser rod 11. Assistance in heat dissipation is desirable to avoid damage and thermo-optic distortions in the composite laser rod 11 while maximizing power input and output.

The clamp assembly 60 illustrated in FIGS. 6–10 provides an effective mount for the laser rod assembly 10 as well as providing an effective additional heat dissipation medium. The laser rod assembly 10 is positioned and retained within an axial bore 62 in the clamp body 61. The clamp body 61 is preferably a metal or some other excellent heat conducting material which is clamped snugly in contact with the reflective coating 16, not only to hold the laser rod assembly 10 in position, but also to establish a good, large surface area heat conductive path directly from the laser rod assembly 10 to the clamp body 61, which acts as a heat sink as well as a rigid mounting structure for the laser rod assembly 10.

The clamp body 61 also has a plurality of reference surfaces 74 for mounting the pump light sources or laser diodes 24 in radial relation to the bore 62 and to the laser rod assembly 10. A plurality of slots 64, 66, 68 radiating outwardly from the bore 62 serve the dual function of compression slots for allowing sufficient resilient flexibility or strain in the clamp body 61 to accommodate clamping of the clamp body 61 onto the laser rod assembly 10 and to admit pump light beam 34 from the pump light sources 24 into the bore 62 and laser rod assembly 10. Therefore, these slots 64, 66, 68 are aligned with the entrance slits 18 in the laser rod assembly 10, and they can function as light guides for the pump light beam 34, as will be described in more detail below.

Figure 9:
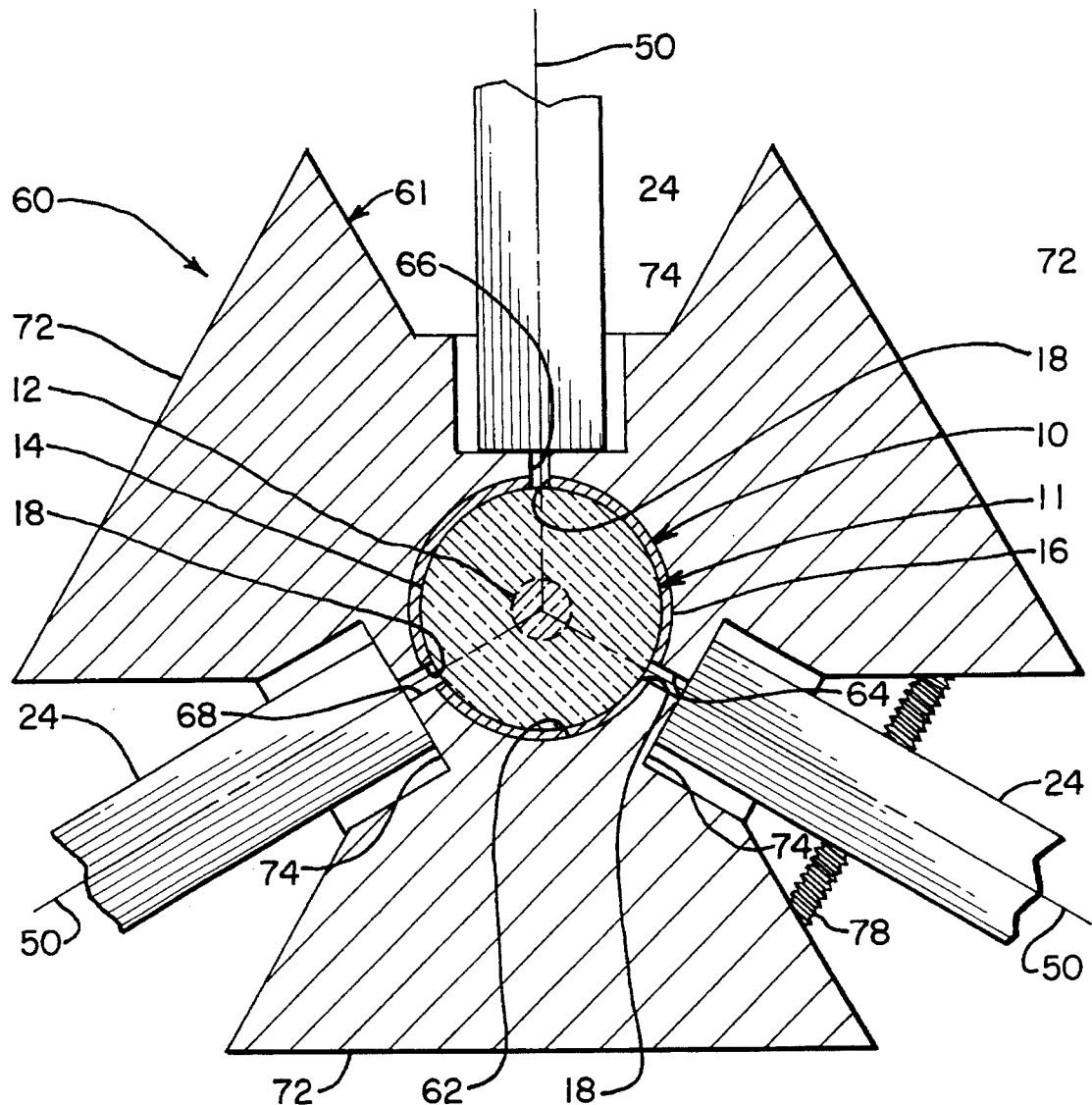
FIG. 9 is an enlarged cross-sectional view of the clamp assembly securing a laser rod that has a reflective coating according to this invention.

The clamp body 61 also has a plurality of massive radial protrusions or heat sink wings 72, which are part of the clamp body 61 and extend radially outward between the reference surfaces 74, for conducting and dissipating heat away from the bore 62. Solid-state thermal electric cooler (TEC) refrigeration units 76 or other cooling system components can be mounted on the lateral surfaces or ends of the heat sink wings 72. A pair of screws 78 extending between two of the heat sink wings 72 for providing the clamping force to flex or strain the clamp body 61 enough to secure the laser rod assembly 10 in the bore 62. One of the slots 64 extends radially all the way through the clamp block 61 from the bore 62 to the reference surfaces 74 between the two heat sink wings 72 that are pulled toward each other by the screws 78 to allow the clamping flexibility necessary to effectively clamp the laser rod assembly 10 in bore 62. The other slots 66, 68 extend from the bore 62 radially toward the respective reference surfaces 74, but not all the way through the clamp body 61, so that they also allow some clamping flexibility in clamp body 61. The remaining solid portions of the damp body 61 between the terminal ends of slots 66, 68 and the respective adjacent reference surfaces 74 maintain the structural integrity and substantial rigidity of the damp assembly 60 while also acting as strain hinges to accommodate the slight clamping flexibility required to clamp the laser rod assembly 10 in bore 62. However, as illustrated in FIG. 9, the pump light sources 24 do extend into the clamp body 61 a sufficient extent from the reference surfaces 74 to intersect the slots 66, 68, so that the slots 66, 68 as well as slot 64 can act as light guides or otherwise admit pump light beams 34 (FIGS. 1–5) into the laser rod assembly 10. The pump source diodes 24 can be attached to adjustment plates 70 (FIGS. 7 and 8) to facilitate adjustment of the axis 50 of the pump light.

Figure 10:
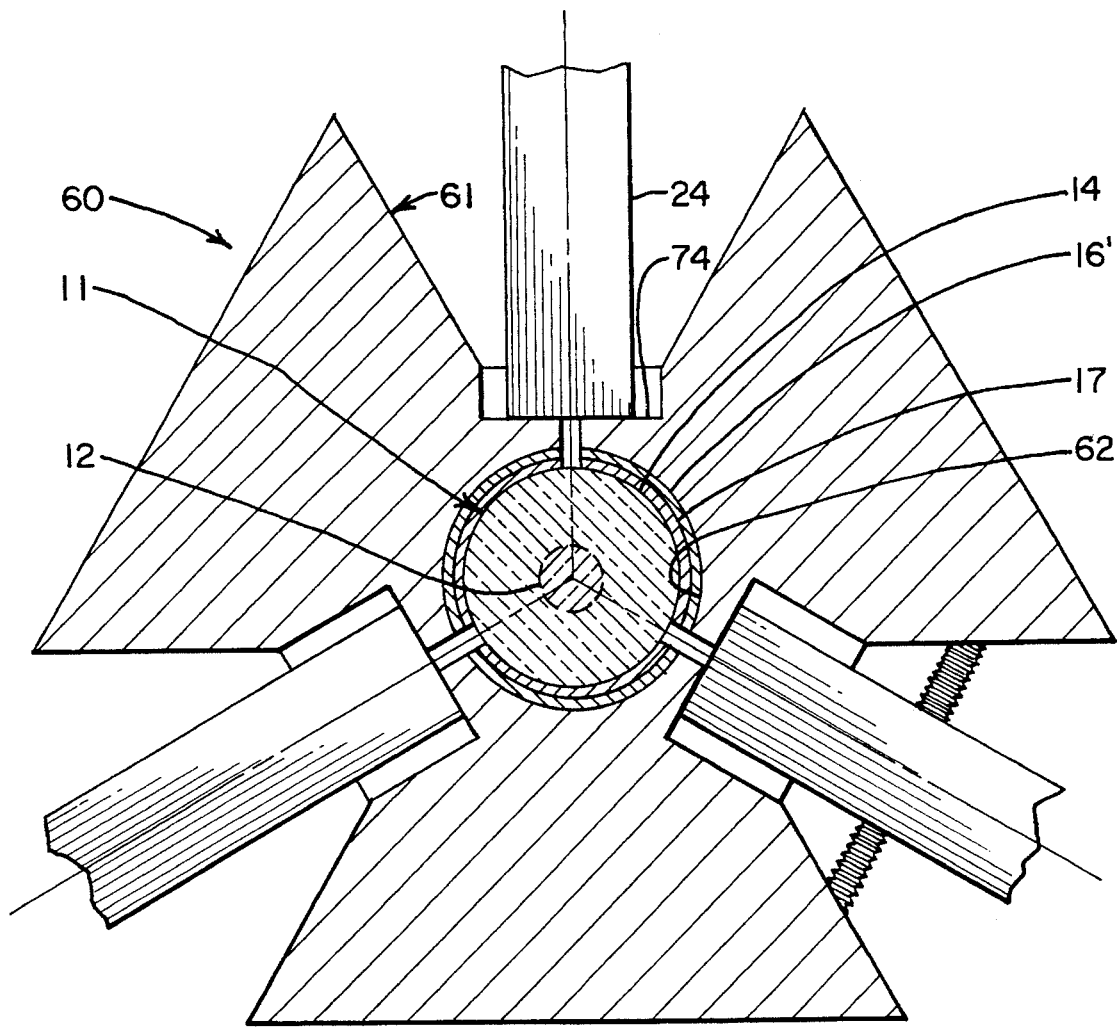
FIG. 10 is a cross-sectional view of the clamp assembly similar to FIG. 9, but with the reflective coating on the inside surface of the clamp assembly rather than on the peripheral surface of the laser rod.

In an alternate embodiment, the reflective surface surrounding the composite laser rod 11, instead of being coated on the peripheral surface of the cladding portion 14, as the reflective coating 16 described above, can be a reflective coating 16' on the surface of the bore 62 in the clamp body 61, as shown in FIG. 10. However, to compensate for the fact that it might be nearly impossible to obtain a perfect fit of the reflective coating surface 16' to the peripheral surface of composite laser rod 11 in this alternate embodiment, a clear, transparent, and heat conducting filler 17, such as Type FGS optical cement, manufactured by Summers Laboratories of Fort Washington, Pa., can be used to preclude air voids that would inhibit heat transfer and scatter light energy. Other than this difference in structure, the composite laser rod 11 and clamp assembly 60 function the same as described above, and the reflective coating 16' confines the pump light to the composite laser rod 11 and results in more passes of the reflected and re-reflected pump light beam 34 through the doped core 12 for enhanced absorption and more gain, as also described above.

Figure 11:
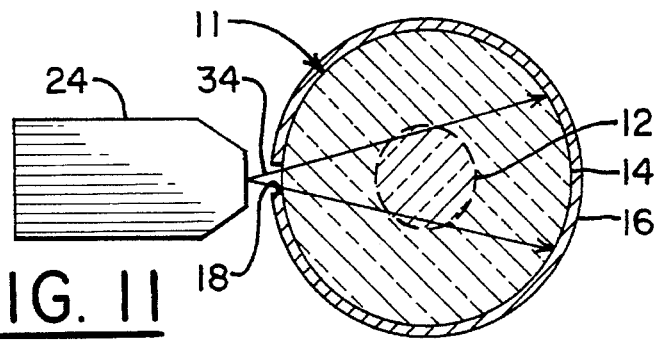
FIG. 11 is a diagrammatic cross-sectional view of the laser rod illustrated with a direct coupling with the laser diode pump source.
Figure 12:
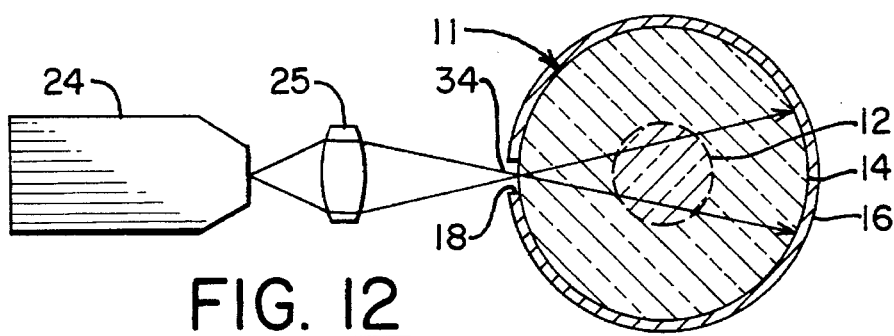
FIG. 12 is a diagrammatic view similar to FIG. 11, but illustrated with an intermediate lens coupling of the laser rod to the laser diode pump.

The coupling of the pump light beam 34 to the composite laser rod 11 can be accomplished in several different ways, as illustrated in FIGS. 11–15. For example, a direct coupled diode 24, as illustrated in FIG. 11, has the pump light beam 34 emanating from the diode 24 and projecting directly through the entrance slit 18 in the reflective coating 16 into the composite laser rod 11. However, different shaping or accommodation of distance between the diode 24 and the composite laser rod 11 can be accomplished by use of an intermediate lens 25, as shown in FIG. 12.

Figure 13:
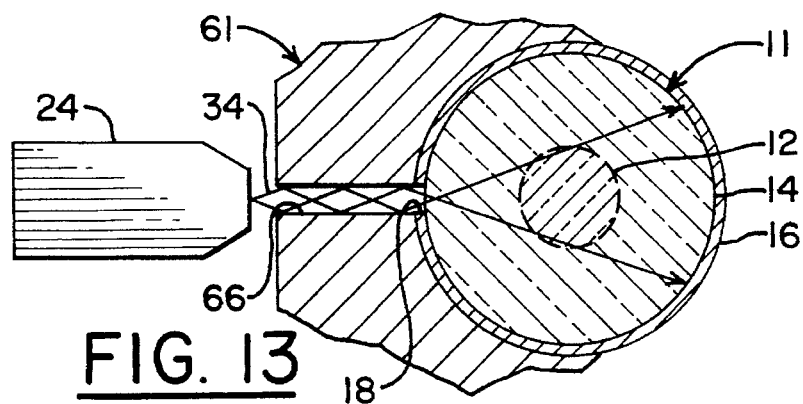
FIG. 13 is a diagrammatic view similar to FIG. 11, but illustrating a light guide coupling of the laser rod to the laser diode pump.
Figure 14:
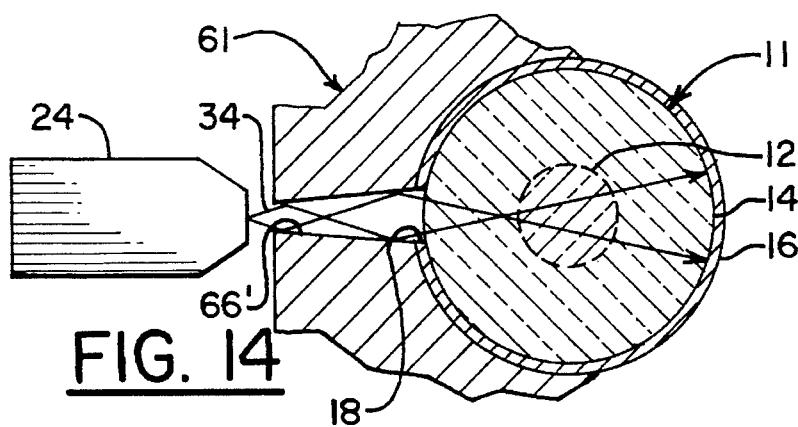
FIG. 14 is a diagrammatic view similar to FIG. 11, but illustrating a tapered light guide coupling of the laser rod to the laser diode pump.

On the other hand, the slot 64, 66, 68 in the damp body, or some similar structure, can provide a light guide for directing the pump light beam 34 into the composite laser rod 11, as shown in FIG. 13. Slanting the sidewalls of the slot 64, 66, 68, to converge or diverge can further shape the pump light beam 34. For example, the diverging slot 66', illustrated in FIG. 14, shows a light guide that results in a narrower projection of pump light beam 34 through the doped portion 12 of the composite laser rod 11, while the converging slot 66" shown in FIG. 15 results in a wider projection. Other angles of divergence or convergence will result in the narrowing or widening of the beam 34 at appropriate places.

The diagrams of FIGS. 11–15 discussed above show only one diode 24 and pump light beam 34, which is for convenience only, and is not intended to limit the number of diodes 24 or pump beams that can be used with these couplings. Also, none of the reflected beams or rays of the beam 34 are shown, but it will be understood by persons skilled in this art that such reflections and re-reflections do occur when light beams or rays are incident on reflected surfaces, such as on the coatings 16 or 16'. The diagram in FIG. 16 shows a roughened reflective surface to enhance diffusion of pump light beam reflections, as discussed above.

Figure 17:
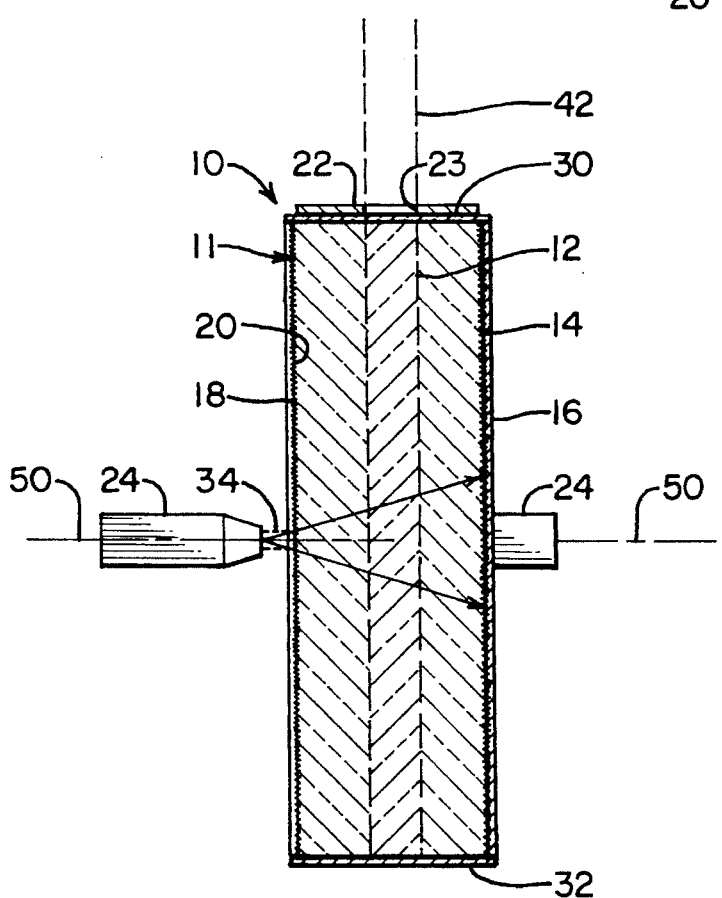
FIG. 17 is a diagrammatic cross-sectional view similar to FIG. 4 of the laser rod assembly of this invention, but illustrating a textured reflective surface for diffusing pump light in the laser rod.

As mentioned above, a textured or grooved reflective surface 20, as shown in FIGS. 16 and 17, can be provided to diffuse the pump light beam 34 in the composite laser rod 11 and thereby increase the likelihood of multiple passes of the pump light beam 34 through the core 12. To minimize axial losses of pump light from the composite laser rod 11, it is preferred that such reflective surface 20 be grooved in the direction parallel to the longitudinal axis 40 of the composite laser rod 11, so that reflections will tend to be more transverse than longitudinal. To further minimize such axial end loss of pump light, a totally reflective cap 22 can be provided on the annulus around the end of the core 12, as shown in FIG. 17. The actual size of the axial opening 23 of the end cap 22 can be varied to match the most efficient laser beam 42 projected from the composite laser rod 11. For example, while most of the laser beam 42 is generated in the core 12, a $TEM_{00}$ mode might be most efficient with the laser beam 42 extending somewhat into the cladding material 14 adjacent the core 12 (not shown).

The reflective coating 16 can be provided on either a smooth, textured, or grooved peripheral surface of the composite laser rod 11 by any conventional coating process, such as sputtering, chemical vapor deposition, or even just dipping or painting. A coating having a thickness of about one micron is usually sufficient. The reflective coating could also comprise a foil, such as indium or gold pressed onto the surface of the composite laser rod 11. Because of the potential presence of oxygen near the surface of the composite laser rod 11, less oxidizing metal reflectors, such as gold might be more suitable than silver or aluminum. However, this invention is not limited to the use of any particular reflective material. Also, any well-known anti-reflective coating can be provided on the surface of the composite laser rod 11 at the entrance slits 18 to enhance more complete admission of substantially all of the pump light beam 34.

Referring again to FIG. 6, the clamp assembly 60 with the laser rod assembly 10 positioned in the bore 62 is adapted for insertion into a rod cell housing 80. Guide surfaces 82 receive and abut the heat sink wings 72 of the clamp assembly 60, while enlarged cavities 86 receive adjustors 70. The solid-state TEC's 76 align with cooling ports 84 in the housing 80 to permit heat flow and disposal, possibly via a heat exchange fluid medium (not shown) or other suitable structure or material.

Figure 18:
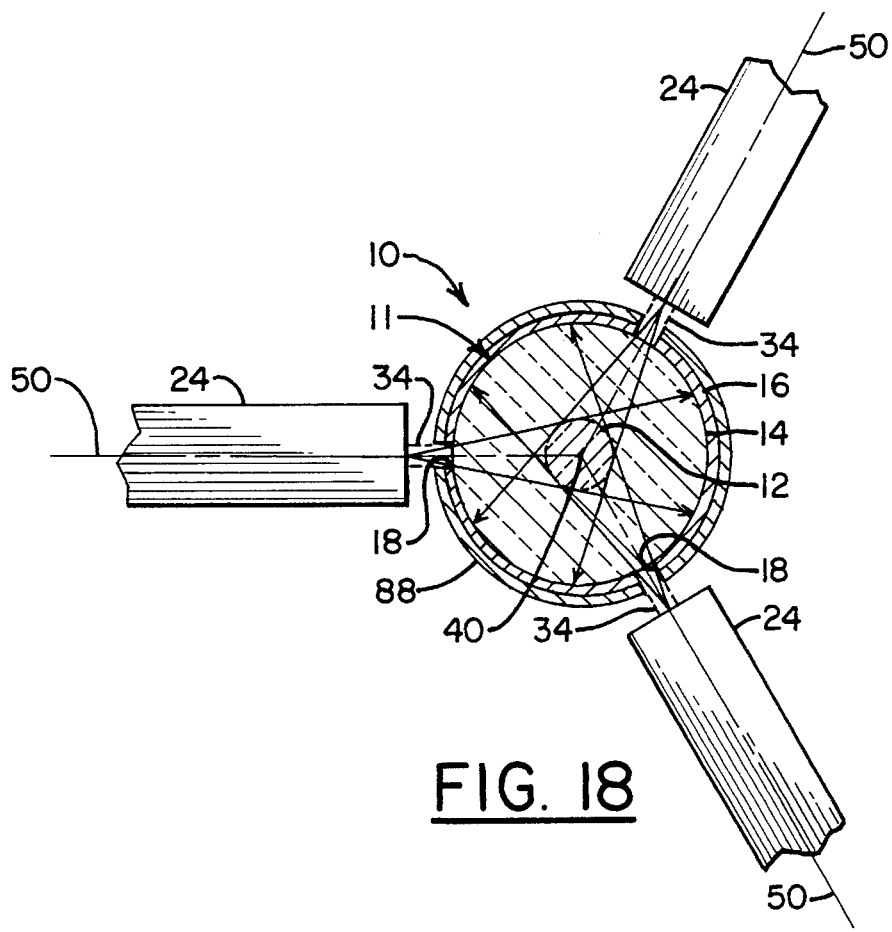
FIG. 18 is a diagrammatic cross-sectional view similar to FIG. 5, but illustrating an outer coating of a light absorptive material surrounding the reflective coating to absorb the lateral laser emissions from the laser rod.

An enhancement of this invention, as shown in FIG. 18, includes an outer coating 88 of a light absorptive material surrounding the reflective coating 16 for absorbing lateral laser emission from the composite laser rod 11 to reduce inefficiencies that might otherwise result from gain, in such lateral emission. Lateral laser emission is useless, so gain in lateral emission resulting from reflecting lateral emission back through the composite laser rod 11 would be in effect a parasitic and non-productive energy consumption. For best results in this embodiment, the reflective coating 16 should be a material that is highly reflective to light of the wavelength of the pump light beam 34, as described above, but practically non-reflective to light of the wavelength of the laser emission from composite laser rod 11. Therefore, while the pump light beam 34 will still be reflected and re-reflected by the highly reflective coating 16, as described above, any laser emission light produced in the composite laser rod 11 to propagate in a lateral direction in relation to the longitudinal axis 40 of the composite laser rod 11 will pass through the coating 16 to be absorbed by the outer coating 88, instead of being reflected back into the composite laser rod 11 where it could produce more lateral laser emission. The coating 16 could be, for example, a dielectric material custom designed to reflect the pump light wavelength, but to transmit laser emission light. Such custom designing of dielectric materials to selectively reflect certain specified wavelength light while transmitting other wavelengths of light is well-known by persons skilled in that art. For example, depositing multiple layers of materials having different indices of refraction permits the design of a coating that is highly reflective of that incident radiation while remaining transmissive of other wavelength radiation. An absorptive material for the outer coating 88, for purposes of this embodiment, may be for example, Polyimide (trademark), which is obtainable from Goodfellow, Inc., of Malvern, Pa.

Figure 19:
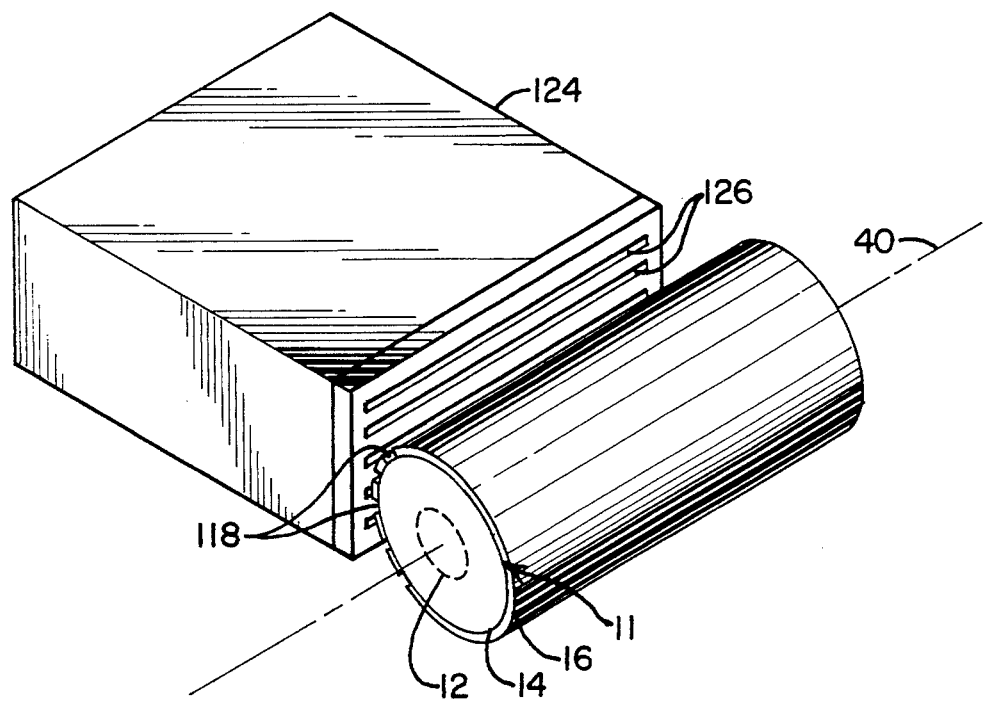
FIG. 19 is a perspective conceptual view of a composite, solid-state laser rod with a reflective peripheral coating according to invention, but illustrated with only a single-diode system exhibiting multiple emitting junctions.
Figure 20:
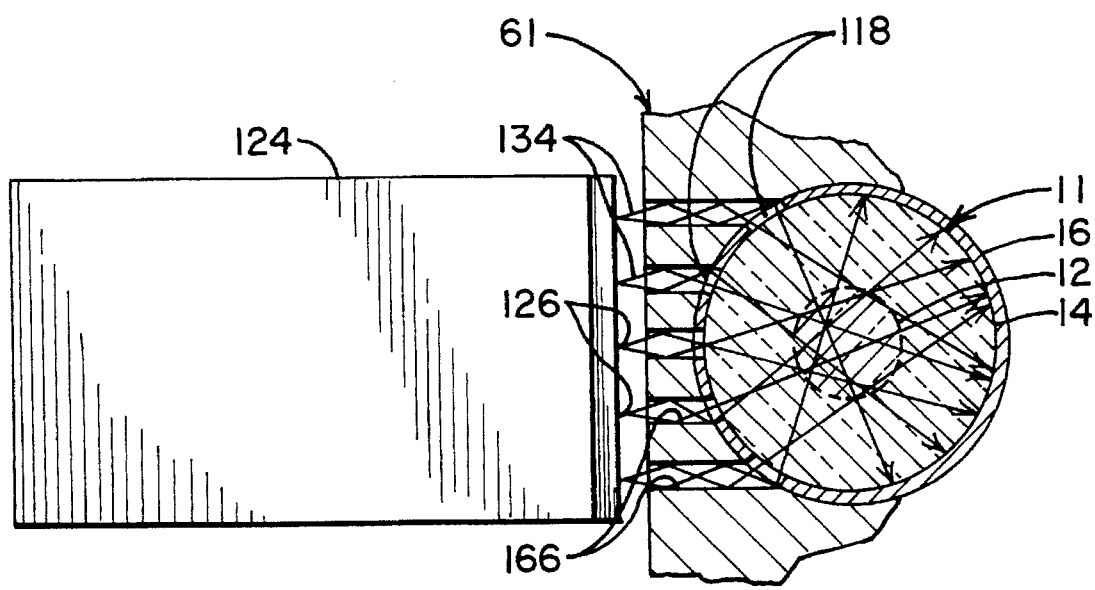
FIG. 20 is a diagrammatic cross-sectional view of the laser rod illustrated with multiple light guide channels in the clamp body corresponding to the emitting junctions of the diode and oriented parallel to one another.
Figure 21:
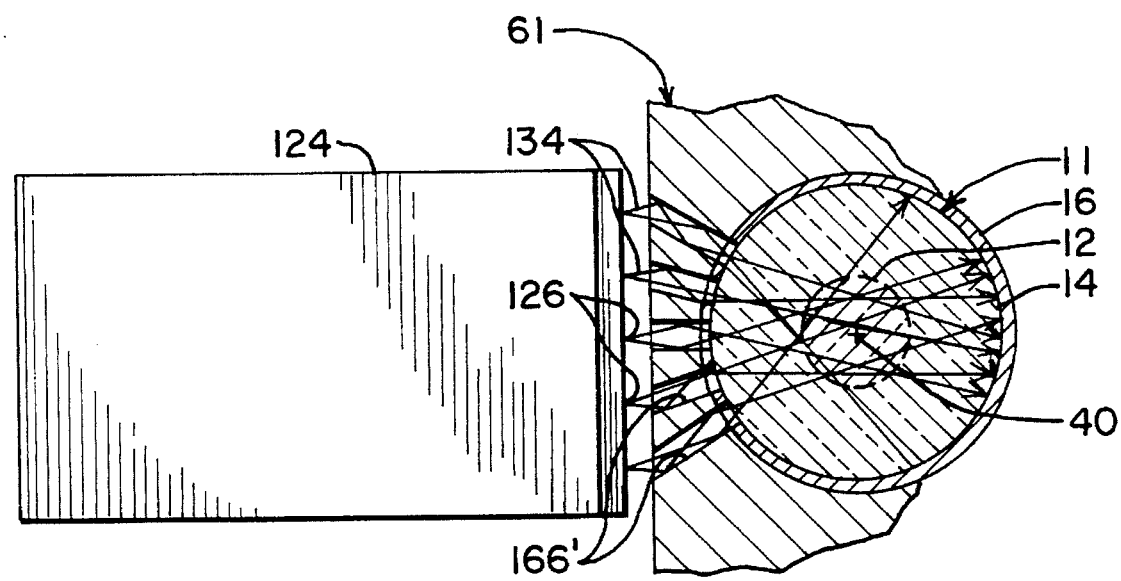
FIG. 21 is a diagrammatic view similar to FIG. 20, but illustrating converging channel walls in the clamp body.

While the pump light source 24 has been described above as a laser diode with a single emitting junction that provides a single beam 34 in the shape of an elongated, cone of light, it can also be a laser diode system having multiple emitting junctions, such as the diode 124 shown in FIG. 19. This diode 124 is shown with five light emitting junctions stacked in a common heat sink that emit elongated, thin laser beams 134 through slits 126 (see FIGS. 19–21). Such diodes are readily available with any number of emitting junctions from one to twenty or more, for example, from Laser Diode Array, Inc., of Auburn, N.Y., and as shown generally in U.S. Pat. No. 5,040,187, issued to Karpinski. Of course, multiple pump beams 134 require multiple entrance slits 118 in the reflective coating 16 to allow the pump light to enter the composite laser rod 11. A plurality of light guide channels 166 in the clamp body 61 can be used to channel the pump beams 134 into the composite laser rod 11. The channels 166 can be oriented parallel to each other in alignment with the emission slits 126, as shown in FIG. 20, or they can be oriented to converge toward the longitudinal axis 40 of the composite laser rod 11, as shown in FIG. 21. Of course the walls of each channel 166 or 166' can be parallel, as shown in FIGS. 20 and 21, or on either converging or diverging, which is not shown in FIGS. 20 and 21, but which is described above and illustrated in FIGS. 14 and 15, to optimize passage of light into the doped core portion 12 of composite laser rod 11.

As mentioned above, the composite laser rod 11 can be fabricated of YAG with the core portion doped with Tm. For purposes of example and not for limitation, other crystal hosts may include garnets, fluorides, oxides, LuAG, YLiF$_4$, LuYAG, YAlO$_3$, ruby, or sapphire, and other dopant ions can include Nd, Ho, Er, Yb, Dy, or Cr, or combinations of any of these ions or of Tm with any of these ions. Co-doping, as described in the U.S. Pat. No. 4,902,127, issued to R. Byer et al., can be used to provide one dopant that absorbs pump light and another dopant that acts as the laser active ion. Non-crystalline glass can also be used for the composite laser rod 11, as is well-known in the art. The glass can be doped or undoped as described above for crystalline structures. The thermal conductivity of glass is lower than thermal conductivity in crystalline materials, so performance could suffer with glass composite laser rods 11, but it would work for some applications.

When the core portion 12 is doped and the cladding portion 14 is undoped, as described above, the refractive index may change slightly, the extent of such change depending on which host material and which dopant is used. Such a change of refractive index between the cladding 14 and the core portion 12 could adversely affect light absorption. If so, a nonabsorptive dopant that is also not laser active, such as Nd, Ho, Tin, Er, Yb, Dy, or Cr, or combinations of these ions, can be added to the cladding portion 14 to change its index of refraction in a similar manner as the dopant in the core potion 12 to minimize or eliminate such refractive index differentials.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Laser rod apparatus, comprising:

an elongated rod having a longitudinal axis and a peripheral surface and which has an atomic structure that absorbs pump light of a first wavelength and emits radiation of a second wavelength in a laser beam that is substantially coaxial with said longitudinal axis of said rod;

said pump light source means positioned adjacent, but spaced a predetermined distance from, said rod for directing pump light substantially transversely into said rod;

reflection means substantially surrounding said peripheral surface of said rod for confining pump light in said rod, said reflection means having an aperture therein for allowing passage of pump light from said side pump light source means into said rod; and a body portion positioned between said rod and said pump light source means and substantially surrounding said reflection means such that said body portion conducts heat away from said rod, said body portion having a slot extending radially through said body portion between said rod and said pump light source means in alignment with said aperture, said slot being configured as a light guide to conduct the pump light through the predetermined distance from the side pump light source means and to shape distribution of the pump light into the rod while said hotly portion adjacent said slot conducts heat away from said rod adjacent said aperture.

2. The laser rod apparatus of claim 1, wherein said atomic structure includes a crystalline structure.

3. The laser rod assembly of claim 2, wherein said crystalline structure comprises yttrium aluminum garnet (YAG).

4. The laser rod assembly of claim 2, wherein said crystalline structure in said core portion is doped with Thulium (Tm).

5. The laser rod apparatus of claim 1, wherein said atomic structure includes glass.

6. The laser rod assembly of claim 1, including a plurality of side pump light source rains positioned in angular spaced relation to each other around, but at predetermined distances from, the rod, said body portion have a plurality of slots configured as light guides aligned with the respective side pump light some means to conduct pump light through the respective predetermined distances from the respective side pump lights source means and to shape distribution of the pump light into the rod, and wherein said reflection means has a plurality of apertures therein disperse angularly around the rod and in alignment respectively with said slots for allowing passage of pump light from said side-pump light source means into said rod.

7. The laser rod assembly of claim 6, wherein none of said apertures are disposed diametrically opposite said crystalline rod from each other.

8. The laser rod assembly of claim 1, wherein said reflection means comprises a light-reflective coating on said peripheral surface of said rod.

9. The laser rod assembly of claim 8, wherein said reflective coating comprises metal.

10. The laser rod assembly of claim 9, wherein said metal includes indium.

11. The laser rod assembly of claim 9, wherein said metal includes gold.

12. The laser rod assembly of claim 9, wherein said metal includes silver.

13. The laser rod assembly of claim 9, wherein said reflection means comprises a foil sleeve surrounding said peripheral surface of said rod.

14. The laser rod assembly of claim 8, wherein said metal reflective coating comprises dielectric material.

15. The laser rod assembly of claim 8, wherein said peripheral surface is smooth and said reflection means causes specular reflection of said pump light.

16. The laser rod assembly of claim 8, wherein said peripheral surface is textured and said reflection means causes diffuse reflection of said pump light.

17. The laser rod assembly of claim 8, wherein said peripheral surface is grooved in a direction that is substantially parallel to said longitudinal axis.

18. The laser rod assembly of claim 1, wherein said rod comprises a core portion that absorbs said pump light and emits said radiation of said second wavelength and a cladding portion surrounding said core portion, said cladding portion being substantially transparent to said pump light.

19. The laser rod assembly of claim 18, wherein said cladding portion has a peripheral surface that is said peripheral surface of said rod.

20. The laser rod assembly of claim 19, wherein said atomic structure of said core portion is doped with a material that absorbs said pump light.

21. The laser rod assembly of claim 20, wherein said core portion is doped with a material that emits laser radiation in response to absorption of said pump light.

22. The laser rod assembly of claim 18, wherein said pump light emanating from said side-pump light source means is shaped to pass substantially entirely within said core portion.

23. The laser rod assembly of claim 1, wherein said body portion includes angularly spaced wing portions extending radially outward on opposite side of said slot for dissipating heat and tightener means for drawing adjacent wing portions toward each other and causing said body portion to flex adjacent said slot to clamp said rod in said bore.

24. The laser rod assembly of claim 23, wherein said tightener means includes a bolt extending between said adjacent wing portions.

25. The laser rod assembly of claim 23, including powered cooling means positioned in contact with said wing portions for drawing heat energy away from said wing portions.

26. The laser rod assembly of claim 1, wherein said reflection means includes a light-reflective material in said bore between said body portion and said rod.

27. The laser rod assembly of claim 26, including a transparent, heat-conductive filler between said reflective material and said rod.

28. The laser rod assembly of claim 1, wherein said slot between said rod and said side-pump light source means has sides that are substantially parallel to each other.

29. The laser rod assembly of claim 1, wherein said slot has sides that converge toward said side-pump light source and diverge toward said rod.

30. The laser rod assembly of claim 1, wherein said slot has sides that converge toward said rod.

31. The laser rod assembly of claim 1, wherein said aperture is a narrow entrance slit in said reflection means.

32. The laser rod assembly of claim 1, wherein said reflection means is highly reflective of said pump light.

33. The laser rod assembly of claim 32, wherein said reflection means is not substantially reflective of the radiation of said second wavelength.

34. The laser rod assembly of claim 1, wherein said pump light source means directs a single beam of pump light toward said rod and said reflection means has an aperture aligned with said single beam.

35. The laser rod assembly of claim 1, wherein said pump light source means directs multiple beams of pump light toward said rod and said reflection means has multiple apertures aligned with said multiple beams of pump light.

36. The laser rod assembly of claim 35, including light guide means for channeling each of said multiple beams of pump light from said pump light source means to said rod.

37. The laser rod assembly of claim 36, wherein said light guide means includes a plurality of light channels in said a body portion surrounding said rod, each of said channels being aligned with one of said multiple beams of pump light.

38. The laser rod assembly of claim 37, wherein said light channels are oriented substantially parallel to each other and to the longitudinal axis of said rod.

39. The laser rod assembly of claim 37, wherein said light channels are oriented to converge toward the longitudinal axis of said rod.

40. Laser rod apparatus, comprising:

an elongated rod having a first end and a second end with a longitudinal axis extending through the first end and the second end and a peripheral surface between the first end the second end and said rod having an atomic structure that absorbs pump light of a first wavelength in a manner that excites ions in the atomic structure to emit radiation of a second wavelength by stimulated emission in a laser beam that is substantially coaxial with said longitudinal axis of said rod;

side pump light source means positioned adjacent, but spaced a predetermined distance from, said rod for directing pump light substantially transversely into said rod;

a body position between said rod and said side pump light source means, said body having a light guide channel extending between the side pump light source means and the rod configured to conduct pump light from the side pump light source means and to shape distribution of the pump light into said rod; and reflection means substantially surrounding said peripheral surface of said rod for confining pump light in said rod, wherein said reflection means has an aperture in alignment with the light guide channel to admit the pump light into the rod, and wherein said reflection means is highly reflective of pump light of said first wavelength to confine pump light in the rod to maximize absorption of the pump light, but is not substantially reflective of radiation of said second wavelength such that radiation of the second wavelength that is propagated laterally rather than parallel to the longitudinal axis is not confined by the reflection means in the rod where it can produce more lateral emission but is instead allowed to escape laterally from the rod and thereby minimizing parasitic power loss.

41. The laser rod assembly of claim 40, including a material surrounding said reflection means that is absorptive of the radiation of said second wavelength.

42. The laser rod apparatus of claim 40, wherein said reflection means comprises dielectric material.

43. Laser rod apparatus, comprising:

an elongated rod having a first end and a second end with a longitudinal axis extending through both the first end and the second end and a plurality of side by side grooves disposed circumferentially around the rod and oriented substantially parallel to said longitudinal axis and which rod has an atomic structure that absorbs pump light of a first wavelength in a manner that excites ions in the atomic structure to emit radiation of a second wavelength by stimulated emission in a laser beam that is substantially coaxial with said longitudinal axis of said rod;

side pump light source means positioned adjacent, but spaced a predetermined distance from, said rod for directing pump light substantially transversely into said rod;

a body position, between said rod said side pump light source means, said body having a light guide channel extending between the side pump light source means and the rod configured to conduct pump light from the side pump light source means and to shape distribution of the pump light into said rod: and reflection means substantially surrounding said rod for confining pump light in said rod, as the grooves diffuse the pump light that is confined the reaction means substantially transverse to the longitudinal axis to minimize loss of pump light through the first end or through the second end while increasing absorption of the pump. light in the; rod.

44. Laser rod apparatus, comprising:

an elongated rod having a longitudinal axis and a peripheral surface and which rod has an atomic structure that absorbs pump light of a first wavelength in a manner that excites ions in the atomic structure to emit radiation of a second wavelength by stimulated emission in a laser beam that is substantially coaxial with said longitudinal axis of said rod;

side pump light source means positioned adjacent, but spaced a predetermined distance from said rod for directing pump light substantially transversely into said rod;

a clamp body that is positioned between the side pump light source means and the rod and that substantially surrounds the rod to support and conduct heat from the rod, and a light guide extending through said clamp body that conducts pump light from the pump light source means to the rod as said clamp body conducts heat away from said rod, said clamp body being adjustably rightenable onto the preipheral surface of the rod; and a reflective foil sleeve substantially surrounding said peripheral surface of sail rod for confining pump light in said rod to increase absorption of the pump light in the rod and to substantially surrounding said peripheral surface of said for confining pump light in said rod to increase absorption of the pump light in the and and to improve contact and at conduction between the rod and the clamp body said reflective foil sleeve having an aperture therein that is elongated in a direction parallel to the longitudinal axis and in alignment with said light guide such that pump light conducted by said light guide is distributed into said rod through said aperture.

45. Laser rod apparatus, comprising:

an elongated rod having a longitudinal axis and a peripheral surface and which rod has an atomic structure that absorbs pump light of a first wavelength in a manner that excites ions in the atomic structure to emit radiation of a second wavelength by stimulated emission in a laser beam that is substantially coaxial with said longitudinal axis of said rod;

side pump light source means positioned adjacent, but spaced a predetermined distance from, said rod for directing pump light substantially transversely into said rod;

reflection means substantially surrounding said peripheral surface of said rod for confining pump light in said rod, said reflection means having a aperture therein for allowing passage of light from said side pump light source means into said rod; and a body positioned between said pump light source means and said reflection means, said body having a light guide channel extending through said body in alignment with both said pump light source means and said aperture, said light guide channel being configured to conduct pump light from the pump light source means and to shape distribution of the pump light into the rod.

46. The laser rod apparatus of claim 45, wherein said light guide channel has juxtaposed surfaces extending between the pump light source means and the aperture that are substantially parallel to each other.

47. The laser rod apparatus of claim 45, wherein said light guide channel has juxtaposed surfaces extending between the pump light source means and the aperture that diverge away from each other as said surfaces approach the aperture.

48. The laser rod apparatus of claim 45, wherein said light guide channel has juxtaposed surfaces extending between the pump light source means and the aperture that converge toward each other as said surfaces approach the aperture.

49. Laser rod apparatus comprising:

an elongated rod having a longitudinal axis and a peripheral surface and which rod has an atomic structure that absorbs pump light of a first wavelength in a manner that excites ions in the atomic structure to emit radiation of a second wavelength by stimulated emission in a laser beam that is substantially coaxial with said longitudinal axis of said rod;

side pump light source means positioned adjacent but spaced a predetermined distance from said rod for directing pump light substantially transversely into said rod, said side pump light source means having multiple light emitters spaced apart from each other;

reflection means substantially surrounding said peripheral surface of said rod for confining pump light in said rod, said reflection means having a plurality of apertures therein in angularly spaced relation to each other for allowing passage of light froms aid multiple light emitters into said rod; and a body positioned between said side pump light source means and said reflection means, said body having a plurality of light guide channels extending through said body and each of the plurality of light guide channels being aligned respectively with one of the light emitters and one of the apertures, said light guide channels being configured to conduct pump light from the respective light emitters and to shape distribution of the pump light from the respective light emitters into rod.

50. The laser rod apparatus of claim 49, wherein said plurality of light guide channels are oriented substantially parallel to each other and to the longitudinal axis of the rod.

51. The laser rod apparatus of claim 49, wherein said plurality of light guide channels are oriented to converge toward the longitudinal axis of the rod.

52. Laser rod apparatus, comprising:

an elongated, composite rod having a longitudinal axis and a peripheral surface, said rod having a doped core comprising an atomic structure that is doped with ions that absorb pump light of a first wavelength in a manner that excites the ions to emit radiation of a second wavelength by stimulated emission in a laser beam that is substantially coaxial with said longitudinal axis of said rod, wherein said doped core has an index of refraction and is surrounded by a doped cladding which is doped with ions that do not absorb pump light of said first wavelength to have an index of diffraction that is substantially the same as the indox of retraction or the doped core whereby means are provided for extending $TEM_{00}$ mode of stimulated emission substantially into e cladding with al adverse effect of index of fraction discontimity between the core and the cladding and thereby increasing power output of stimulated emission;

side pump light source means positioned adjacent said rod for directing pump light substantially transversely into said rod; and reflection means substantially surrounding said peripheral surface of said rod for confining pump light in said rod.

53. The laser rod structure of claim 52, wherein said core has a crystalline atomic structure and said cladding has a crystalline atomic structure.

54. The laser rod structure of claim 52, wherein said core has a noncrystalline atomic structure and said cladding has a noncrystalline atomic structure.

* * * * *